Jan. 29, 1929.  
F. M. BRITTNACHER  
1,700,118  
OIL GAUGE  
Filed June 20, 1928
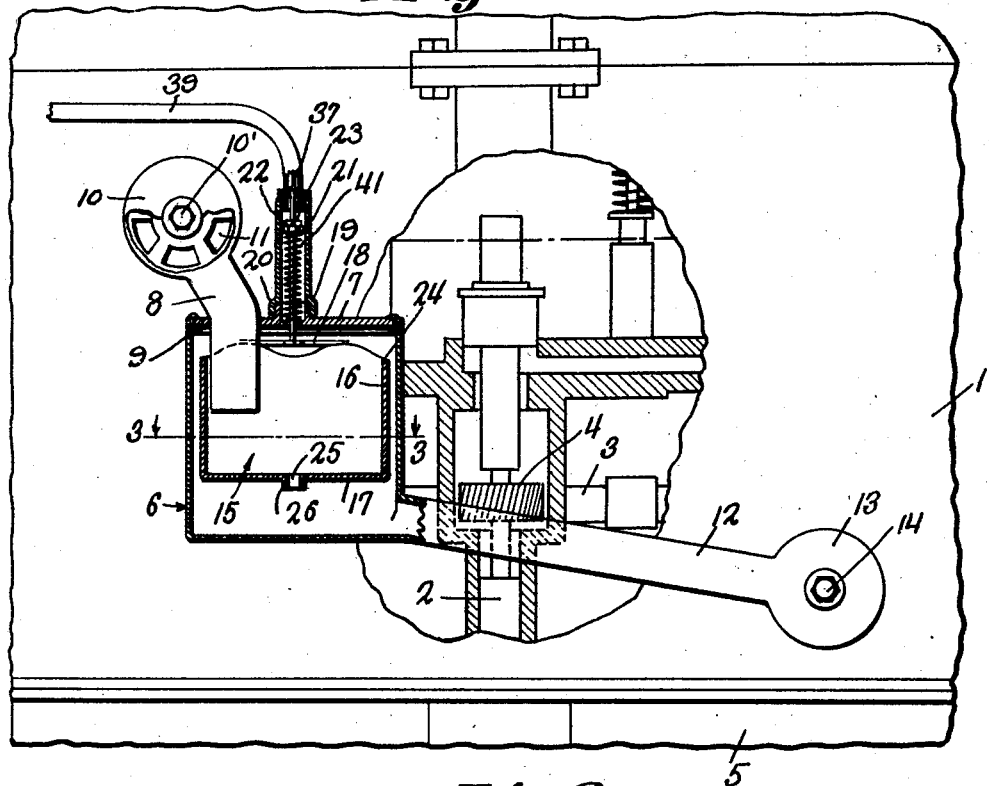
Inventor  
Frank M. Brittnacher  
By Irving L. McMathan  
Attorney Patented Jan. 29, 1929.

1,700,118

UNITED STATES PATENT OFFICE.

FRANK M. BRITTNACHER, OF APPLETON, WISCONSIN.

OIL GAUGE.

Application filed June 20, 1928. Serial No. 286,964.

This invention relates to improvements in oil gauges for the internal combustion engines of automobiles and more particularly to a gauge which is designed for installation upon an automobile the engine of which is not already equipped with such a device and one of the objects of the present invention is to provide a gauge which may be readily installed upon the "Model A" Ford automobile in lieu of the overflow or return pipe by way of which the oil is conducted from the valve chamber to the oil pan.

Another object of the invention is to provide an attachment which may be installed without any disarrangement of the engine parts except the removal of the return pipe, referred to above, and to provide, in connection with the portion of the attachment thus installed, a gauge adapted to be mounted upon the dash or instrument board of the automobile to indicate to the driver, at all times, the sufficiency of the oil supply as well as the efficiency of the oil pumping apparatus of the engine, thus enabling the driver to immediately observe conditions which would result in damage to the engine, such for example as complete exhaustion of the oil supply or any cessation of operation of the oil distributing mechanism.

Another object of the invention is to provide a gauge which will be sensitive and accurate in the functioning of its parts so that it can be depended upon to give warning in the event of a dangerous lowering of the oil supply or any improper functioning of the oil distributing apparatus of the engine.

While the accompanying drawings and the description which is to follow, constitute a disclosure of the preferred embodiment of the invention, it will be understood that various changes may be made within the scope of what is claimed.

In the accompanying drawings:

Figure 1 is a view partly in side elevation and partly in vertical section illustrating the oil gauge embodying the invention installed upon an engine of the said Ford type, a portion of the engine casing being broken away;

Figure 2 is a top plan view of the device embodying the invention, installed;

Figure 3 is a horizontal sectional view taken substantially on the line 3—3 of Figure 1 looking in the direction indicated by the arrows;

Figure 4 is a view in front elevation of the indicator of the gauge;

Figure 5 is a vertical front to rear sectional view through the indicator of the gauge.

The drawing illustrates the gauge embodying the invention as installed upon the internal combustion engine of a Model A Ford automobile which engine is indicated in general by the numeral 1 and embodies the usual oil pump 2 driven from the cam shaft 3 by the worm gearing 4, the oil pan of the engine being indicated in general by the numeral 5. As is well known, in engines of this type, when there is a sufficient supply of oil and the oil pumping mechanism is operating with the desired efficiency, the oil level in the valve chamber of the engine will be maintained constant as indicated by the broken line in Figure 1. A decided lowering of the oil supply to the danger point, either through exhaustion or leakage of the oil supply, or a failure of the circulating mechanism to properly distribute the oil, will of course result in a lowering of the level of the oil in the system and as this will result in damage to the mechanism, the present invention contemplates a gauge which will operate automatically to indicate the existence of these conditions and which gauge is constructed and arranged as will now be described.

As previously stated, the gauge embodying the invention, is designed to be installed in lieu of the usual overflow or return pipe by which the oil is returned, from the valve chambers to the oil pan, while the engine is in operation, and the gauge includes an oil chamber which is indicated by the numeral 6 and which is preferably of the cylindrical form shown in the drawing. The oil chamber is provided with a removable closure or top indicated by the numeral 7, and a pipe 8 is fitted and secured through an opening 9 formed in the said top and is provided with a cup-shaped flange 10 at its upper end which is secured by a bolt 10' to the side of the engine housing and placed in communication with the lubricant space of the valve chamber of the engine by way of the usual passages or ports 11. A pipe 12 leads from the opposite side of the oil chamber 6 at the bottom of said chamber and is inclined downwardly and forwardly and provided at its lower end with a cup-shaped attaching flange 13 by which it is placed in communication with the oil pan 5 of the engine, the said flange being secured to the wall of the engine casing by a bolt 14.

The indicator of the device is controlled or actuated through the medium of a plunger 15 which is of hollow cylindrical form and preferably of sheet metal and includes a circumferential wall 16 and a bottom 17, the plunger being open at its top. The plunger is of a diameter slightly less than the diameter of the oil chamber 6 so that it may have vertical movement therein under conditions to be presently explained, and the said plunger 15 is so arranged within the oil chamber 6 that the portion of the pipe 8 which extends downwardly within the oil chamber will likewise extend downwardly into the plunger to deliver oil into the same. In order to guide the plunger 15 and maintain the same centered within the oil chamber 6 and likewise in order to provide for connection between the said plunger and the indicator of the device, a spider 18 has the ends of its arms secured to the upper edge of the circumferential wall 16 of the plunger and occupies a position above the open top thereof, and a stem 19 is secured at its lower end to the center of the spider and is guided upwardly through an opening 20 formed centrally in the said top 7 of the oil chamber. A compression spring 21 is fitted upon the stem 19 and bears at its lower end against the top 7 of the oil chamber 6 and at its upper end against an abutment nut 22 which is adjustably threaded onto the upper portion of the said stem and is held in positions of adjustment by a jam-nut 23 likewise threaded onto said stem.

At this point it will be evident that the tendency is for the spring 21 to maintain the plunger 15 in the elevated position shown in Figure 1 of the drawing, but it will likewise be understood that when oil is delivered into the plunger by way of the pipe 8 and the plunger becomes filled with oil, the weight of the filled plunger will overcome the tension of the spring 21 and the plunger will lower in the oil chamber 6. For a purpose to be presently explained, the upper edge of the circumferential wall 16 of the plunger 15 is of undulatory form so as to provide a plurality of overflow recesses 24 in said edge, and an outlet opening 25 is provided in the bottom 17 of the plunger preferably centrally thereof. Inasmuch as the ports 11 are located at the level of the oil in the valve chamber of the engine and the pipe 8 is placed in communication with these ports through the medium of the head 10, oil will overflow from the valve chamber, so long as the supply of oil to the chamber is adequate, through the said ports 11 and by way of the pipe 8 into the plunger 15. The outlet opening 25 in the bottom of the plunger is of relatively small diameter as will be observed by reference to Figures 1 and 3 of the drawing, and therefore, while there will be a discharge of oil through this opening, there will likewise be an overflow of oil from the plunger by way of the overflow recesses 24 in the upper edge of the circumferential wall of the plunger. As stated however, when the plunger is full of oil, the tension of the spring 21 will be overcome and the plunger 15 will lower, in the chamber 6, until a short nipple 26, which surrounds the opening 25 in the bottom of the plunger, rests upon the bottom of the oil chamber 6. At this point it will be evident that when the oil distributing system of the engine is functioning properly and there is an adequate supply of oil, the plunger 15 will be filled to overflowing and will therefore occupy a lowered position within the chamber 6. On the other hand, in the event the supply of oil becomes exhausted or substantially exhausted or if, for any reason, the oil distributing system of the engine ceases to function or functions inefficiently, the supply of oil to the plunger 15 will be diminished to such an extent that there will be little or no oil in the plunger and therefore the spring 21 will shift the plunger and the stem 19 in an upward direction. This effects actuation of the indicator of the device in a manner which will now be described.

The indicator referred to above is indicated in general by the numeral 27 and is preferably mounted upon the dash or instrument board of the automobile and comprises a casing including a substantially semi-cylindrical body 28 which is vertically disposed and provided at its upper and lower ends with flanges 29 provided with openings 30. The body of the indicator casing is closed at its rear by a back plate 31 disposed against the open rear side of the body of the casing and in marginal registration with the side walls thereof and with the flanges 29, openings 32 being provided in the upper and lower ends of the said back plate so that securing screws or bolts (not shown) may be fitted through the openings 30 and 32 for the purpose of securing the body of the casing to the back plate and securing the casing, as a whole, upon the instrument board or dash. The numeral 33 indicates a segmental display member which is pivotally mounted as at 34 upon the back plate 31 of the casing with its arcuate face presented close and concentric to the inner surface of the front wall of the body of the casing, the said member 33 being movable past a sight opening 35 which is provided in said wall and bearing, as indicated by the numeral 36, indicia such for example as the letters "E" and "F," the letter "E" being representative of the word "empty" and the letter "F" being representative of the word "full."

By reference to Figures 4 and 5 of the drawing it will be evident that when the member 33 is in the elevated position shown in these figures, the letter "E" will be exposed through the sight opening 35 indicating that the supply of oil is exhausted or in other words that the lubricating system is empty or substantially empty, and, when the member 33 is in a lowered position, the letter "F" will be displayed indicating that the system is properly supplied with lubricant. In order that the member 33 may be automatically swingingly adjusted to indicate the condition of the oil distributing system, a flexible wire 37 is connected at one end as at 38 to the lower side of the display member 33 and is led into and through a tubular sheath or housing 39 connected at one end as at 40 to the back wall 31 of the indicator casing. The guide 39 leads to and is connected with the upper end of a rigid tube 41 mounted at its lower end upon the top 7 of the oil chamber 6, and the wire 37 is led into the upper end of this tube and connected to the upper end of the stem 19.

From the foregoing description of the invention, it will be understood that so long as the oil distributing system of the engine is functioning properly and there is an adequate supply of oil, the plunger 15 will be filled with oil and assume a full lowered position with the nipple 26 upon its bottom 17 resting upon the bottom of the oil chamber 6 and at the time the plunger moves to this position, a downward pull will of course be exerted upon the stem 19 against the tension of the spring 21 thus exerting a pull upon the rod 37 to swing the display member 33 of the indicator downwardly to position with its indicating letter "F" opposite the sight opening 35, it being understood that the proportioning of the parts in such as to insure of the indicator or display member 33 assuming this position at the time the plunger is lowered. Of course the display member will maintain this position so long as the oil distributing system of the engine is functioning properly and so long as there is an adequate supply of oil. However, in the event the supply of oil becomes depleted either through consumption or leakage, to such extent as to render damage to the bearings or other moving parts of the engine, imminent, that volume of the oil which is within the plunger 15 will drain through the opening 25 and the said plunger will be automatically shifted upwardly through the action of the spring 21 thus exerting an upward thrust against the wire 37 and effecting an upward swinging movement of the display member 33 to position with the indicating letter "E" opposite the sight opening 35 thus indicating to the driver of the automobile, equipped with the device, the necessity of either replenishing the oil supply or attending to repairs or adjustments of the component parts of the oil distributing system of the engine.

It will be understood, of course, that the outlet opening 25 will be of such diameter as to provide for filling of the plunger with oil and an overflow of oil from the plunger into the oil chamber, when the system is supplied with oil and that, in the event of lowering of the oil supply to the damage point, the oil in the plunger will be drained therefrom through said opening to permit the spring 21 to act.

Having thus described the invention, what I claim is:

1. In indicating mechanism of the class described, an oil chamber, a hollow, open-top plunger vertically movable within said chamber, an oil inlet pipe leading into the upper portion of the oil chamber and having its discharge end positioned to discharge oil into the said plunger, an oil outlet pipe leading from the lower portion of the oil chamber, an indicator member, operative connection between the said member and the plunger, and means yieldably holding the plunger in elevated position.

2. In indicating mechanism of the class described, an oil chamber, a hollow, open-top plunger vertically movable in said chamber, an oil inlet pipe leading into the upper portion of the oil chamber and having its discharge end positioned to discharge oil into the said plunger, the plunger having an outlet opening in its bottom of small diameter, an oil outlet pipe leading from the lower portion of the oil chamber, an indicator member, operative connection between said member and the plunger, and means yieldably holding the plunger in elevated position.

3. In indicating mechanism of the class described, an oil chamber, a hollow, open-top plunger vertically movable in said chamber, an oil inlet pipe leading into the upper portion of the oil chamber and having its discharge end positioned to discharge oil into the said plunger, an oil outlet pipe leading from the lower portion of the oil chamber, an indicator member, operative connection between the said member and the plunger, a spring yieldably holding the plunger in elevated position, and means for varying the tension of the spring.

4. An indicating mechanism of the class described, an oil chamber, a hollow, open-top plunger vertically movable in said chamber, an oil inlet pipe leading into the upper portion of the oil chamber and having its discharge end positioned to discharge oil into the said plunger, the plunger having an outlet opening of small diameter in its bottom, a stem extending upwardly from the plunger and through the top of the oil chamber, a spring upon the stem yieldably holding the plunger in an elevated position, an oil outlet pipe leading from the lower portion of the oil chamber, an indicating member, and operative connection between said indicating member and the stem.

5. In indicating mechanism of the class described, an oil chamber, a hollow, open-top plunger vertically movable in said chamber and including a circumferential wall and a bottom, the said chamber being open at its top and the upper edge of the circumferential wall of the chamber having a series of overflow recesses formed therein, the plunger having an overflow opening of small diameter in its bottom, the oil chamber having an outlet near its bottom, an oil inlet pipe leading into the top of the oil chamber and having its discharge end positioned to discharge oil into the said plunger, a spider upon the top of the said plunger, a stem upstanding from the spider and through the top of the oil chamber, a tubular casing upon the top of the oil chamber into which the said stem extends, a tubular conduit leading from the said casing, a spring upon the said stem bearing at its lower end against the top of the casing, an adjustable abutment upon the stem for the upper end of the spring, an indicator means including a display member, the tubular conduit leading to the indicator mechanism, and a flexible wire extending within said conduit and connected to the upper end of said stem and to the display member of the indicator mechanism.

In testimony whereof I affix my signature.

FRANK M. BRITTNACHER.